United States Patent
Cesak et al.

(10) Patent No.: US 8,967,189 B2
(45) Date of Patent: Mar. 3, 2015

(54) HOLLOW VALVE PLATE

(75) Inventors: Roland Cesak, Schwabbruck (DE); Olaf Bielmeier, München (DE)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 206 days.

(21) Appl. No.: 13/639,521

(22) PCT Filed: Mar. 29, 2011

(86) PCT No.: PCT/EP2011/054799
§ 371 (c)(1),
(2), (4) Date: Nov. 27, 2012

(87) PCT Pub. No.: WO2011/124502
PCT Pub. Date: Oct. 13, 2011

(65) Prior Publication Data
US 2013/0087233 A1    Apr. 11, 2013

(30) Foreign Application Priority Data
Apr. 8, 2010 (AT) .................................. A 566/2010

(51) Int. Cl.
*F16K 49/00* (2006.01)
*F16K 15/14* (2006.01)
*F04B 39/06* (2006.01)
*F04B 39/10* (2006.01)

(52) U.S. Cl.
CPC ............. *F16K 15/14* (2013.01); *F04B 39/064* (2013.01); *F04B 39/1066* (2013.01); *F04B 39/1073* (2013.01)

USPC .................. 137/340; 137/512.1; 137/512.15; 137/855; 417/571; 251/366

(58) Field of Classification Search
USPC ................. 137/340, 512, 512.1, 512.15, 855; 417/571; 251/366
See application file for complete search history.

(56) References Cited

U.S. PATENT DOCUMENTS

| 2,449,408 | A | * | 9/1948 | Naab | 417/432 |
|---|---|---|---|---|---|
| 3,375,972 | A | | 4/1968 | Raufeisen | |
| 4,027,853 | A | * | 6/1977 | Linnert | 251/361 |
| 4,854,839 | A | * | 8/1989 | DiFlora | 417/571 |
| 5,222,516 | A | * | 6/1993 | Schrocker | 137/340 |
| 5,390,700 | A | * | 2/1995 | Fink et al. | 137/512.15 |
| 5,806,225 | A | | 9/1998 | Gardner et al. | |
| 5,980,219 | A | | 11/1999 | Spurny | |
| 6,016,833 | A | * | 1/2000 | Spurny et al. | 137/512.1 |
| 6,116,874 | A | | 9/2000 | Nation et al. | |
| 8,337,177 | B2 | | 12/2012 | Mezza et al. | |
| 2006/0067844 | A1 | * | 3/2006 | Iversen | 417/458 |

FOREIGN PATENT DOCUMENTS

DE    2404124    7/1975

* cited by examiner

*Primary Examiner* — Kevin Murphy
(74) *Attorney, Agent, or Firm* — Dykema Gossett PLLC

(57) ABSTRACT

The hollow valve plate 1 of a piston compressor for liquid-cooled reed valves comprises a single half-shell 3 with cooling channels 4 which are open on the cylinder side, which said half-shell is covered by a reed plate 2 which is preferably welded or glued at least along the cooling channels 4 and has in the area of the suction openings 5 in each case one suction reed 6 which is machined out and is integrally connected on one side. Production and assembly are thereby simplified and the clearance is reduced.

5 Claims, 2 Drawing Sheets

HOLLOW VALVE PLATE

BACKGROUND OF THE INVENTION

Field of The Invention

The invention relates to a hollow valve plate for liquid-cooled reed valves of a piston compressor.

THE PRIOR ART

Specifically for the use as an air brake compressor in motor vehicles or similar applications running frequently for a long time with high power, it is necessary to actively cool the valve plate carrying at least one suction reed on the cylinder side and at least one discharge reed on the cylinder head side in order to avoid overheating in this area, and also to precool the compressed air expelled via the discharge valves, at least to a certain degree, before the air is then, in most cases, further cooled in the cylinder head area prior to being discharged. According to the prior art, for this purpose valve plates are used which are hollow in some areas or are provided with cooling channels, and the cooling chambers or cooling channels of which are connected to a liquid cooling system of an internal combustion engine used for driving a motor vehicle.

Current prior art for producing such hollow valve plates is usually brazing. The individual parts to be brazed consist of a number of thin stamped steel plates which are connected in packets so as to form one unit, wherein from meander-shaped cut-outs and recesses in some areas of the middle plates together with the outer plates, which are closed except for inlet and outlet openings, cooling channels or cooling chambers are created. However, there are also embodiments having two half-shells (mostly made of grey cast iron) which comprise channels or areas that are open on one side and which, when being assembled, form closed, three-dimensional channels or chambers on the inside. In both embodiment variants, the suction reeds and the discharge reeds are separately and sealingly fastened on the valve plate by means of plug-in sleeves or the like.

Apart from the fact that the known valve plates therefore consist of a relatively high number of individual parts and are also relatively complicated in terms of production and assembly, they also have the disadvantage that the clearance created on the cylinder side, thus the design-related dead space which cannot be compressed any further, is relatively large, which has a negative influence on the volumetric efficiency of the compressor.

It is an object of the present invention to design a valve plate of the aforementioned kind in such a manner that production and assembly are simplified and that the design-related clearance on the cylinder side remains as small as possible.

This object is achieved according to the present invention in that the valve plate has only one half-shell with cooling channels that are open on the cylinder side, which half-shell is covered by a reed plate which is sealed at least along the cooling channels and has in the area of the suction opening(s) in each case one suction reed which is machined out from the reed plate and is integrally connected on one side. Thus, a reed plate already known from the prior art (see, for example, DE 1 628 187 A1 or EP 846 227 A1) which covers the entire valve plate and which is clamped together with the same between cylinder and cylinder head, can serve at the same time for closing on the cylinder side the cooling channels in the half-shell which are open on the cylinder side, so that due to the elimination of the separate second half-shell and the cylinder-side cover plate previously forming and, respectively, closing these channels in the cooled valve plates, not only production and assembly of such hollow valve plates are significantly simplified, but, furthermore, the cylinder-side clearance is also reduced by up to 50% (with respect to previous embodiments with two half-shells). Also, sealing the entire system is simpler because a sealing plane is eliminated. Additional advantages are the associated weight and cost savings.

In a particularly preferred further configuration of the invention, the reed plate is permanently connected, preferably welded or glued, to the half-shell at least along the cooling channels so that a connection of the reed plate with the half-shell, while sealing at the same time only the necessary areas, is ensured. If further through openings provided in the reed plate and/or the half-shell are also to be sealed, this can be carried out in a very simple manner by expanding the welding or the adhesive bond also to these areas.

BRIEF DESCRIPTION OF THE DRAWINGS

The invention is explained in more detail hereinafter by means of the exemplary embodiment illustrated in the drawings.

DETAILED DESCRIPTION OF THE DEPICTED EMBODIMENT

Figure 1:
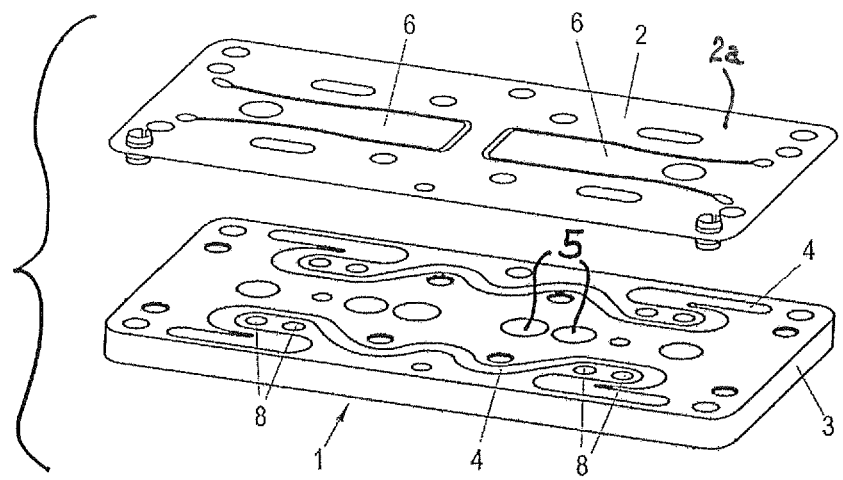
FIG. 1 shows a perspective view of a valve plate designed according to the invention in an exploded view from the side of the suction reed (thus from the cylinder side)
Figure 2:
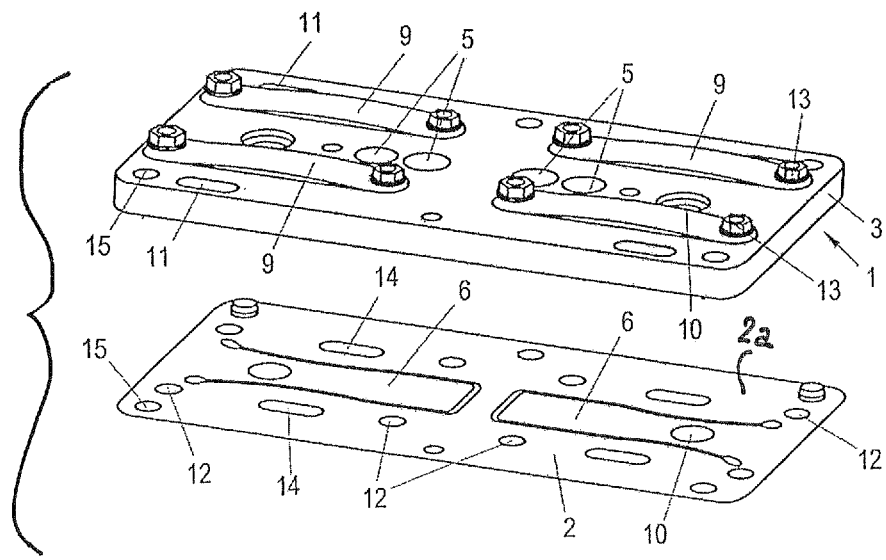
FIG. 2 shows the valve plate according to FIG. 1 viewed from the discharge valve side in an exploded view.

In all figures, only the valve plate 1 itself is illustrated—the cylinder block of a two-cylinder piston compressor, which is omitted here for clarity reasons, follows in the illustration according to FIG. 2 on the bottom side of the reed plate 2 (assembled with the half-shell 3)—and above the half-shell 3 (in the illustration according to FIG. 2), the cylinder head is to be imagined, which comprises suction and discharge channels including the corresponding connections, cooling channels and the like.

Figure 3:
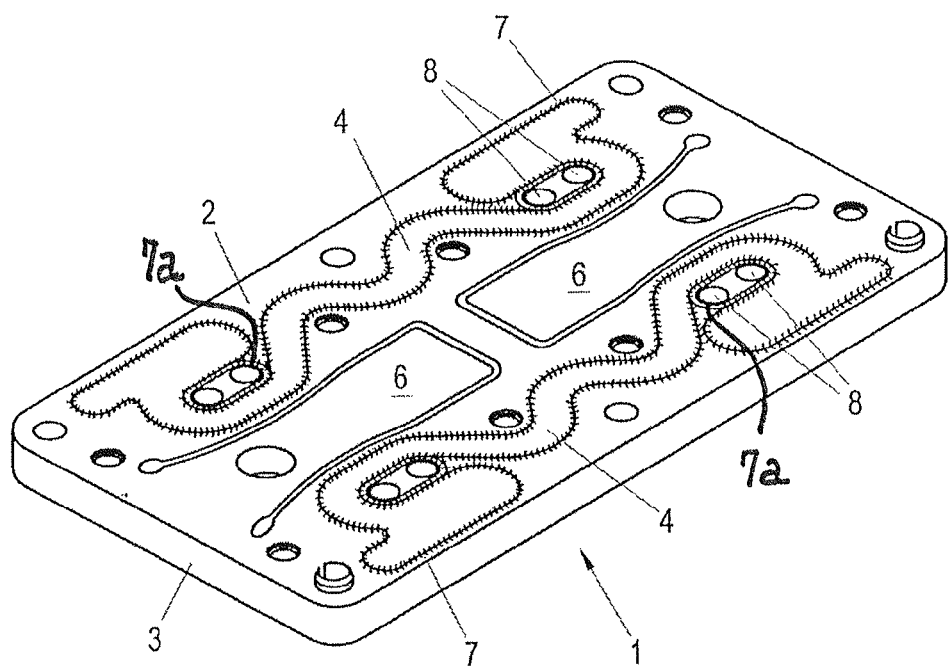
FIG. 3 shows the valve plate in the assembled state from the side of the welded reed plate with the suction reed.

The half-shell 3 comprising cooling channels 4 which are open on one side on the cylinder side is covered by the reed plate 2 which is sealed at least along the cooling channels 4 and which has in the area of the suction openings 5 in each case one suction reed 6 which is machined out from the reed plate 2 and is integrally connected on one side (the suction reed 6 is internal to the main body 2a of the reed plate 2). According to FIG. 3, the reed plate 2 is permanently connected here to the half-shell 3 not only along the cooling channels 4 (for example, through the indicated welding bead 7 or a corresponding adhesive bond), but also in the area around the discharge openings 8 which, according to FIG. 2, are controlled on the upper side of the valve plate by separately attached discharge valves 9. Apart from this, a separate sealing of these discharge openings 8 is possible with bead 7a (FIG. 3).

In this manner, the hollow valve plate 1 is formed on the suction side from only two parts—the half-shell 3 with the cooling channels 4 which, by themselves, are open, and the reed plate 2 which provides at the same time the function of the suction reed and the closure of the cooling channels 4. Thus, there are fewer parts, resulting in lower production and assembly expenditures and also lower weight and lower costs. Moreover, it is also immediately comprehensible that through the thin reed plate 2, the cylinder-side clearance can be significantly reduced with respect to a separate cover plate or a second half-shell, which has a beneficial effect on the volumetric efficiency of the compressor.

Only for the sake of completeness, the bores 15 for the fastening screws of the cylinder head, which are not illustrated here, the so-called control bore 10, and the bores 11 for the cooling water inlet and outlet are also marked in FIG. 2. Finally, the openings in the reed plate 2 for passing through the fastening screws 13 for fixing the discharge valves 9 on the non-illustrated cylinder are designated with 12, and the through holes to the discharge openings 8 are designated with 14.

The invention claimed is:

1. A hollow plate valve for a piston compressor, said plate valve comprising:
   a half shell which has opposite first and second surfaces and which defines a suction inlet opening therethrough and a cooling channel therein which opens to said first surface,
   a reed plate positioned adjacent and directly connected to said first surface of said half shell, said reed plate including a one-piece main body and an internal suction reed which is machined from and connected with said main body along only one side edge so as to be movable relative said main body for opening and closing said suction inlet opening of said half shell, and
   an endless bead between the reed plate and the half shell, said endless bead surrounding and sealing the cooling channel between the reed plate and the half shell.

2. The hollow plate valve according to claim 1, wherein said endless bead consists of a weld.

3. The hollow plate valve according to claim 1, wherein said endless bead consists of glue.

4. The hollow plate valve according to claim 1, wherein said half shell includes two discharge openings, and including an additional endless bead surrounding and sealing the two discharge openings between the reed plate and the half shell.

5. The hollow plate valve according to claim 4, wherein said half shell includes a discharge valve for controlling fluid flow through the two discharge openings.

* * * * *